UNITED STATES PATENT OFFICE.

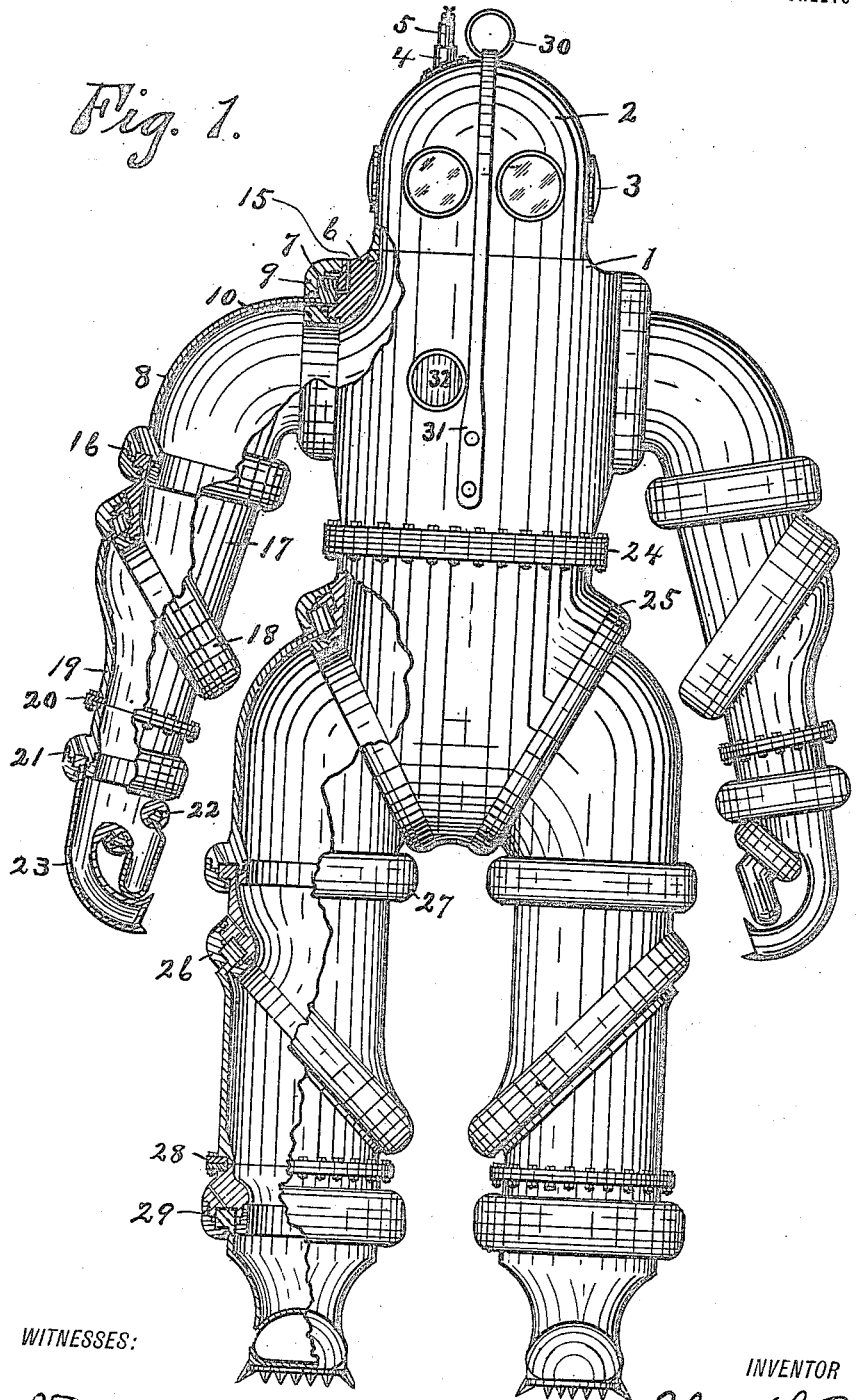

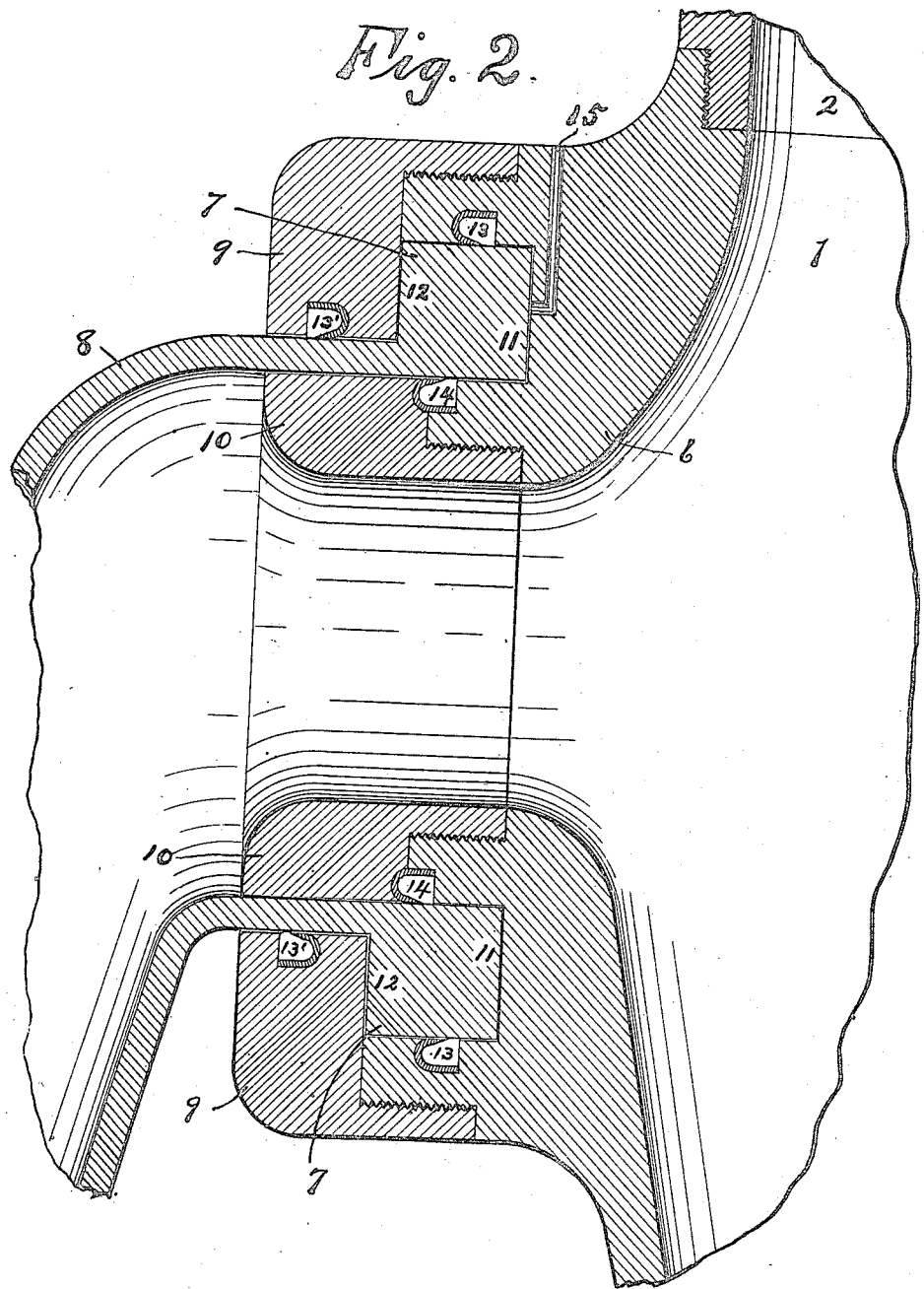

HARRY L. BOWDOIN, OF BAYONNE, NEW JERSEY.

SUBMARINE ARMOR.

1,146,781.

Specification of Letters Patent. Patented July 20, 1915.

Application filed March 19, 1914. Serial No. 825,833.

*To all whom it may concern:*

Be it known that I, HARRY L. BOWDOIN, a citizen of the United States, and a resident of the city of Bayonne, in the county of Hudson and State of New Jersey, have invented certain new and useful Improvements in Submarine Armor, of which the following is a specification.

This invention relates to submarine armor, and has especial reference to metal sectional armor. Metal armor of this type, by reason of its strength and rigidity, is especially useful for deep sea diving; but its practical efficiency is materially dependent upon the flexibility of the sections at their joints or connections under actual working conditions in order to enable the diver when incased in the armor to kneel, crawl and otherwise move his body and members with comparative ease and facility.

The object of my invention is to furnish a sectional armor possessing the essential requirements indicated; and to that end I provide for the armor sections a novel joint connection which is automatically balanced by the water pressure, and I so mount and arrange the joints of the respective sections that free movements of the sections to meet the varying demands of service are readily attainable.

Accordingly my invention comprises novel constructions and features, all of which will be fully understood from the detailed description hereinafter presented, reference being had to the accompanying drawings, in which:

Figure 1 is a front view of the submarine armor, partly sectioned, and showing the construction and special location of the joints. Fig. 2 is an enlarged, sectional view of a balanced shoulder joint, the same principle being applied to all joints, each, however, being of such shape as best suited for its particular purpose.

The armor consists of a body —1— with helmet —2— carrying thick glass ports —3— and an entering clamp socket —4— for the made up cable of double hose and electric wires —5—. On each side of the body is a shoulder socket —6— in which is seated balance rings —7— of the upper arm section —8— said rings being rotatably held in place by lock rings —9—10— which also carry suitable means of packing. The area of each of the inner faces —11— (Fig. 2) of the balance rings —7— is equal to the area of the outer effective surface of the upper arm section —8— and the outer face —12— of the associated balance ring —7— is protected from the outside water pressure by the packings —13—13'— and hence the application of the external water pressure against the face 11 balances the pressure against the joint and enables it to be easily moved at all times in a fore and aft rotary direction. Water is admitted from the outside to the inner face —11— of the balance ring through a hole or holes —15— and is prevented from leaking into the armor by the packing —14—.

In the elbow section —17— of each arm is a diagonally placed balanced joint —18— of the character just described which joint enables an unlimited swing away from the body to be given to the lower arm section —19—. Another similar balanced joint —16— is placed above the joint 18 between the sections —8— and —17— so as to turn at right angles, or substantially so, to the major axis of the arm sections, thereby enabling the arm to be swung across, as well as away from the body. The arm sections may be lengthened or shortened by means of rings placed between the flanges —20—. A joint —21— also rotatable at right angles, or substantially so, to the major axis of the arm sections, is placed at the wrist to give further arm movement, and a joint —22— is suitably placed at the base of the thumb in the hand section —23— to enable the hand to be opened or closed by swinging the thumb to one side so that the diver may grasp things in the curved hand section. The special combination of joints in the arms of the armor enables a diver to move his arms as fully and freely in any direction as he could without the armor.

The body of the armor —1— may be lengthened or shortened by means of rings between the flanges —24—. The lower part of the body section is made so as to form hip sockets at which point joints —25— are placed at such angles as to allow full swinging, fore and aft leg movements. Other joints —26— placed at the knees of said armor at a suitable angle diagonally to the major axes of the respective leg sections allow a full free movement in the plane of said angle, but, as such angle would carry the lower legs away from the body, horizontal joints —27— are placed in the upper leg sections, thereby correcting such movement to any extent desired.

The leg sections may be lengthened or shortened by means of rings placed between the flanges —28—. At the angles are placed joints —29— at right angles, or substantially so, to the major axes of the respective leg sections, to enable the diver to turn while walking, or to turn the feet to one side while kneeling or crawling.

The armor is suspended and handled from the ring —30— which is reinforced by a strap —31— passing to the front and rear of the body section and fastened thereto. A search light —32— is placed on the armor and a telephone inside the helmet.

Entrance to, and exit from the armor may preferably be made by separating the body section at the flange —24—.

To operate: The armor being separated at the body flange the diver enters the lower section and stands therein. The upper section is then lowered over his head and arms, he having raised his hands over his head and placed his arms in the arm sections as they are being lowered. The body flange is then securely bolted together. The armor and diver are hoisted over the side and lowered to the bottom. By means of the special combination of joints the diver may walk or crawl, if on a slanting deck, to the object it is desired to recover, and may kneel or assume any position necessary to fasten a chain thereto. The joints being so constructed as to allow water at the outside pressure to act on an equal area on opposed sides of each joint balances the pressure and allows free and easy movement of the joint at any depth.

What I claim is:

1. In submarine armor, two relatively movable sections whereof one is provided with a joint member and the other with a complementary socket member therefor, said members having inner and outer surfaces in opposite relation to each other, and means whereby pressure is applied to the inner part of said joint member to counterbalance the external pressure on the section having said member.

2. In submarine armor, two relatively movable sections provided with associated joint members, one of which members has inner and outer effective surfaces of equal area exposed to external pressure and both of which members have between said inner and outer surfaces unexposed bearing surfaces, whereby a balanced connection between said members is effected.

3. In submarine armor, two relatively movable sections provided with associated joint members, one of which members has inner and outer effective surfaces of equal area exposed to external pressure and both of which members have between said inner and outer surfaces unexposed bearing surfaces, together with packing between said members.

4. In submarine armor, two relatively movable sections provided with associated joint members, one of which members has inner and outer effective surfaces of equal area and both of which sections have between said inner and outer surfaces unexposed bearing surfaces, one of said sections being provided with a duct leading from the exterior of the structure to the said inner surface whereby a balancing water pressure is exerted upon the said inner and outer surfaces.

5. In a metal submarine armor the combination of balanced shoulder joints with fore and aft movement, balanced upper arm joints having horizontal movement and elbow joints having opposing effective surfaces of equal area exposed to external pressure, said elbow joints being placed at an angle to said shoulder and upper arm joints and having a rotary movement in the plane of said angle.

6. In a metal submarine armor the combination of balanced shoulder joints having fore and aft motion, balanced upper arm joints having horizontal movement, balanced elbow joints having a movement at an angle to the others and a wrist joint having opposed effective surfaces of equal area exposed to external pressure and having a horizontal movement, together with a hand section carrying a thumb joint of similar construction.

7. In a metal submarine armor the combination of balanced hip joints, balanced thigh joints and knee joints placed at an angle to the others, and having opposing effective surfaces of equal area exposed to external pressure.

8. Sectional submarine armor having independent rotary joints in the arm sections at the shoulder, wrist, upper arm and elbow portions, the shoulder joint being rotatable on a substantially horizontal axis, the upper arm and wrist joints being rotatable on a plane at right angles, or substantially so, to the major axis of the arm sections, and the elbow joint being rotatable in diagonal relation to said axis.

9. In sectional submarine armor a diagonally-disposed joint for associated sections having capacity for a rotary fore and aft movement, said joint having inner and outer surfaces in opposite relation to each other and means whereby the inner surface is exposed to external pressure correspondingly with the outer surface, thereby balancing said joint in its rotary movement.

10. Sectional submarine armor having rotary joints in the leg sections at the hip, knee and ankle portions, and having also a rotary joint in the upper leg section between the knee and the hip, said latter joint and the ankle joint being on a plane at right angles, or substantially so, to the major axis of the leg sections, and the hip and knee joints being in diagonal relation to said axis.

Signed at Bayonne city, in the county of Hudson and State of New Jersey.

HARRY L. BOWDOIN.

Witnesses:
JOHN I. MERRITT,
I. J. MERRITT.

Copies of this patent may be obtained for five cents each, by addressing the "Commissioner of Patents, Washington, D. C."